United States Patent [19]

Hull et al.

[11] Patent Number: 5,503,789
[45] Date of Patent: Apr. 2, 1996

[54] METHOD OF FORMING AND MAKING A CARVABLE/MOLDABLE MATERIAL

[76] Inventors: Harold L. Hull, 401 Canyon Way #43, Sparks, Nev. 89434; John D. Barton, 128 Smithridge, Reno, Nev. 89502

[21] Appl. No.: 222,445

[22] Filed: Apr. 4, 1994

[51] Int. Cl.$^6$ .................................................. B29C 67/24
[52] U.S. Cl. .......................... 264/138; 264/333; 106/772; 106/778
[58] Field of Search .................................. 264/138, 162, 264/333; 106/772, 778

[56] References Cited

U.S. PATENT DOCUMENTS

| | | | |
|---|---|---|---|
| 3,054,687 | 9/1962 | Montgomery | 106/778 |
| 3,598,621 | 8/1971 | Ferrara | 106/778 |
| 4,256,500 | 3/1981 | Turpin, Jr. | 106/88 |
| 4,501,618 | 2/1985 | Gebhard et al. | 106/109 |
| 5,030,289 | 7/1991 | Sattler et al. | 106/805 |
| 5,223,035 | 6/1993 | Hopkins et al. | 106/707 |

*Primary Examiner*—Timothy M. McMahon

[57] ABSTRACT

Herein disclosed is a "METHOD FOR FORMING AND MAKING A CARVABLE/MOLDABLE MATERIAL" used for making artistic works of art. The method includes a mixture of pozzolan, plaster of paris, a liquid binder and water which when mixed, then poured into a mold and allowed to cure, forms a workpeice of carvable material. However a most important feature of the present invention is the fact that at any later time if the artist so desires, application of a small amount of water upon the surface of the workpeice will restore the workpeice into a moldable condition so as to allow the artist to recarve, mold, shape and/or restore, unlike any artistic carvable/moldable material heretofore disclosed.

1 Claim, No Drawings

METHOD OF FORMING AND MAKING A CARVABLE/MOLDABLE MATERIAL

FIELD OF THE INVENTION

Our present invention relates to a method for forming and making a carvable/moldable material used for making artistic works of art, but more particularly relates to a method which includes a mixture consisting of pozzolan in a powder form, plaster of paris, a liquid binder such as Southcrete #25, and water which when mixed, then poured into a mold and allowed to cure, forms a workpeice of carvable/moldable material for artistic purposes. However, a most important feature of the present invention is the fact that at any later time if the artist so desires, application of a small amount of water upon the surface of the workpeice will restore the workpeice into a moldable condition so as to allow the artist to recarve, mold, shape and/or restore, unlike any artistic carvable/moldable material heretofore disclosed.

BACKGROUND OF THE INVENTION

In the past as well as within the present times, artists have used various carvable/moldable materials for forming and shaping artistic works of art, such as wax, ceramics, clay etc. With these types of materials the main disadvantage and drawback is the fact that the artist has one chance to make their creation correctly as these materials once formed may not be changed, shaped and/or restored as can the present invention. A further disadvantage of the current materials is the need for heat or the like, such as when using ceramics.

Also, the present invention includes the use of pozzolan in the mixture to enhance the materials properties. Nowhere in the prior art (known to the applicants) do they teach the use of pozzolan in a powder form being included in the mixture to form a material for creating artistic works of art. The only pozzolan related patents found by the applicants are as follows; U.S. Pat. Nos. 5,223,035, 4,501,618 and U.S. Pat. No. 4,256,500 all of which do not provide a moldable material such as the present invention.

OBJECTS OF THE INVENTION

A most important object of the present invention is to provide a mixture which includes the following ingredients; 20% water, 25% pozzolan in a powder form, 25% plaster of paris and 30% of a liquid binder such as Southcrete #25, these percentages are for example only as these quantities are of engineering choice.

Another object is to provide within the mixture a powder form of pozzolan for enhanced properties.

Still another object of the present invention is to provide a mold such as in the shape of a block which is used to shape and/or form the moldable material into a workpeice so as to provide the artist with a conveniently shaped carvable object.

A primary object of the present invention to provide a method and/or process for forming and making a carvable/moldable material used for making artistic works of art which includes various steps such as;

a. combining the water with the ingredients in quantities of engineering choice to make a mixture;

b. mixing the mixture into a consistency of engineering choice;

c. pouring the mixture into a mold;

d. allowing the mixture to cure to a partially dry and hardened condition;

e. breaking the mold, whereby leaving the cured mixture in the shape and size of the mold and therefore forming the workpeice and the workpeice now assuming its carvable condition;

carving the workpeice into the shape of artist choice and g. allowing the workpeice to dry.

Yet another important object of the present invention is to provide a moldable condition for the workpeice so as to allow the workpeice to be altered, reshaped and/or restored anytime the artist so desires simply by adding a small amount of water to the surface of the workpeice.

SUMMARY OF THE INVENTION

It will now be seen that we have provided a method for forming and making a workpeice of carvable/moldable material such as in the shape of a block or the like which may be used for carving and/or molding artistic works of art.

It will further be seen that we have provided a carvable/moldable material which allows an artist (if they so desire) the opportunity to reshape, form, alter and/or restore the workpeice at anytime simply by applying a small amount of water to the surface of the workpiece.

Further objects and advantages will become apparent when taken into consideration with the full scope of the specifications and claims as herein presented.

Although the invention has been shown and described in what is conceived to be the most practical and preferred process/method, it is recognized that departures may be made therefrom within the scope and spirit of the invention, which is not be be limited to the details disclosed herein but is to be accorded the full scope of the claims so as to embrace any and all equivalent processes and/or methods.

Having described our invention, what we claim as new and desire to secure by Letters Patent is;

1. A method of forming and making a carvable/moldable material, including a first water, a second water, ingredients, a mixture, a mold and a workpeice, said workpeice including a surface, said mixture consisting of said first water and said ingredients, said ingredients including pozzolan, plaster of paris and a liquid binder, said first water said second water and said ingredients being in quantities of engineering choice, and said mold being of a size and shape to form said workpeice, comprising the steps of;

a. combining said water with said ingredients to make said mixture;

b. mixing said mixture into a consistency of engineering choice;

c. pouring said mixture into said mold;

d. allowing said mixture to cure to a partially dry and hardened condition;

e. breaking said mold, said cured mixture being of said size and shape of said mold, whereby forming said workpeice and said workpeice assuming said carvable condition;

f. carving said workpeice into a shape of artist choice;

g. allowing said workpeice to dry;

h. applying said second water to said surface of said workpeice, whereby allowing said workpeice to assume said moldable condition and;

I. molding said workpeice into a shape of artist choice and

J. allowing said workpeice to dry.

\* \* \* \* \*